US011675911B2

(12) United States Patent
Panicker et al.

(10) Patent No.: US 11,675,911 B2
(45) Date of Patent: Jun. 13, 2023

(54) SYSTEM AND METHOD FOR MANAGING SECURITY RISK OF INFORMATION TECHNOLOGY SYSTEMS IN AN ENTERPRISE

(71) Applicant: Wipro Limited, Bangalore (IN)

(72) Inventors: Vinod Ramachandra Panicker, Kochi (IN); Sumod Rajan George, Kakkanad (IN)

(73) Assignee: Wipro Limited, Bangalore (IN)

(*) Notice: Subject to any disclaimer, the term of this patent is extended or adjusted under 35 U.S.C. 154(b) by 389 days.

(21) Appl. No.: 17/142,413

(22) Filed: Jan. 6, 2021

(65) Prior Publication Data
US 2022/0138327 A1   May 5, 2022

(30) Foreign Application Priority Data
Nov. 4, 2020   (IN) .............................. 202041048079

(51) Int. Cl.
  *G06F 21/57*   (2013.01)
  *G06F 16/245*  (2019.01)
(52) U.S. Cl.
  CPC .......... *G06F 21/577* (2013.01); *G06F 16/245* (2019.01); *G06F 2221/033* (2013.01)
(58) Field of Classification Search
  CPC .................. G06F 21/577; G06F 2221/033
  See application file for complete search history.

(56) References Cited
U.S. PATENT DOCUMENTS

| | | | |
|---|---|---|---|
| 7,359,962 B2 | 4/2008 | Willebeek-Lemair et al. | |
| 7,614,083 B2 | 11/2009 | Khuti et al. | |
| 10,339,299 B1 * | 7/2019 | Magnuson | H04L 9/3239 |
| 10,846,210 B1 * | 11/2020 | Singh | G06F 8/71 |
| 2007/0112847 A1 * | 5/2007 | Dublish | G06Q 10/06 |
| 2009/0307763 A1 * | 12/2009 | Rawlins | G06F 11/2294 |
| | | | 714/E11.002 |

(Continued)

OTHER PUBLICATIONS

Gao et al. Testing as a Service (TaaS) on Clouds 2013 IEEE Seventh International Symposium on Service-Oriented System Engineering (Year: 2013).*

*Primary Examiner* — David J Pearson
(74) *Attorney, Agent, or Firm* — Finnegan, Henderson, Farabow, Garrett & Dunner, LLP

(57) ABSTRACT

The disclosure relates to system and method for managing security risk of information technology (IT) systems in an enterprise. The method includes determining valid trustware components that need to be evaluated for security risk of an IT system within the enterprise; correlating information associated with each of the valid trustware components in a set of data repositories; generating a mapping list comprising the valid trustware components, test cases corresponding to each of the valid trustware components, and test environments corresponding to each of the valid trustware components based on the correlation; triggering trustware security units for testing the valid trustware components based on the mapping list; and identifying security issues associated with the valid trustware components based on the testing. The trustware security units are arranged in a sequential manner or a parallel manner to align with execution of the test cases corresponding to each of the valid trustware components.

20 Claims, 6 Drawing Sheets

(56) References Cited

U.S. PATENT DOCUMENTS

| | | | |
|---|---|---|---|
| 2018/0285247 A1* | 10/2018 | Gandhi | G06F 11/3668 |
| 2021/0042211 A1* | 2/2021 | Proud | G06F 11/0766 |
| 2021/0089437 A1* | 3/2021 | Reid | G06F 11/3684 |
| 2021/0303696 A1* | 9/2021 | Weber | G06F 21/577 |

* cited by examiner

SYSTEM AND METHOD FOR MANAGING SECURITY RISK OF INFORMATION TECHNOLOGY SYSTEMS IN AN ENTERPRISE

TECHNICAL FIELD

The present disclosure relates generally to information technology (IT) security, and more particularly to system and method for managing security risk of IT systems in an enterprise.

BACKGROUND

Typically, organizations or users focus on securing software components or hardening hardware components. This process of securing the components was sufficient for the nature of solutions that were developed and deployed traditionally. In addition to this, today, security of software applications is also required to prevent various attempts by hackers to steal private information from the organizations. The hackers may steal private information by leveraging known vulnerabilities in underlying software or hardware components used for building the applications. In order to secure the applications, most of the conventional techniques focus on securing the software components as an independent entity. Such conventional techniques helped secure only individual components and not necessarily all the components of an information technology (IT) system, which were leveraged by hackers to steal information. For example, conventional techniques failed to consider all the components required for the software applications. These unprotected components may be then leveraged by the hackers to hack the IT system. Therefore, the conventional techniques may fail to perform threat assessment at a holistic level, and integration/dependance of the applications with various hardware or software components (e.g., external applications) makes them vulnerable to hacking attempts.

Further, the conventional techniques tackle only known vulnerabilities that are already existing in the software components. Typically, the existing security tools may refer to a data repository of known vulnerabilities for flagging potential issues in the software components. For example, consider a scenario where an application includes multiple software components and each software component has different versions. In such scenario, if the security tools are unable to determine all the software components and the exact version of the software components used in the application, then the conventional techniques may be ineffective to handle these software components and may result in the inherent vulnerabilities in such components to slip the security testing process.

In short, various existing techniques for securing software and hardware components are limited in their scope and utility. For example, the existing techniques perform security assessments at component level ant not at a holistic level. Further, some of the existing techniques do not assess and remediate security gaps existing in an application layer, a network layer, a data layer, a transmission or integration layer and third-party libraries. It is effort intensive and time taking to provision a configurable test environment in the existing techniques as they are more focused on setting up environments for specific security testing activities for securing specific individual components.

SUMMARY

In one embodiment, a method of managing security risk of information technology (IT) systems in an enterprise is disclosed. In one example, the method may include determining a set of valid trustware components that need to be evaluated for security risk of an IT system within an enterprise. The method may further include correlating information associated with each of the set of valid trustware components in a set of data repositories. The set of data repositories may include a trustware component data repository, an enterprise test case data repository, and a test environment data repository. The method may further include generating a mapping list that includes the set of valid trustware components, a set of test cases corresponding to each of the set of valid trustware components, and one or more test environments corresponding to each of the set of valid trustware components based on the correlation. The method may further include triggering a set of trustware security units for testing the set of valid trustware components, based on the mapping list and access control permissions received for the test environments that are being provisioned for the testing. The testing may include sequencing and prioritizing execution of the set of test cases so as to cover a testing scope of each of the set of valid trustware components and to cover a testing scope arising out of integrating each of the set of valid trustware components with each of the plurality of remaining valid trustware components. Further, the set of trustware security units may be arranged in at least one of a sequential manner or a parallel manner to align with execution of the set of test cases corresponding to each of the set of valid trustware components. The method may further include identifying one or more security issues associated with the set of valid trustware components based on the testing.

In another embodiment, a system for managing security risk of IT systems in an enterprise is disclosed. In one example, the system may include a processor and a memory communicatively coupled to the processor. The memory may store processor-executable instructions, which, on execution, may cause the processor to determine a set of valid trustware components that need to be evaluated for security risk of an IT system within an enterprise The processor-executable instructions, on execution, may further cause the processor to correlate information associated with each of the set of valid trustware components in a set of data repositories. The set of data repositories may include a trustware component data repository, an enterprise test case data repository, and a test environment data repository. The processor-executable instructions, on execution, may further cause the processor to generate a mapping list that includes the set of valid trustware components, a set of test cases corresponding to each of the set of valid trustware components, and one or more test environments corresponding to each of the set of valid trustware components based on the correlation. The processor-executable instructions, on execution, may further cause the processor to trigger a set of trustware security units for testing the set of valid trustware components, based on the mapping list and access control permissions received for the test environments that are being provisioned for the testing. The testing may include sequencing and prioritizing execution of the set of test cases so as to cover a testing scope of each of the set of valid trustware components and to cover a testing scope arising out of integrating each of the set of valid trustware components with each of the plurality of remaining valid trustware components. Further, the set of trustware security units may be arranged in at least one of a sequential manner or a parallel manner to align with execution of the set of test cases corresponding to each of the set of valid trustware components. The processor-executable instructions, on execution, may further cause the processor to identify one or more security issues associated with the set of valid trustware components based on the testing.

In yet another embodiment, a non-transitory computer-readable medium storing computer-executable instruction for managing security risk of IT systems in an enterprise is disclosed. In one example, the stored instructions, when executed by a processor, may cause the processor to perform operations including determining a set of valid trustware components that need to be evaluated for security risk of an IT system within an enterprise. The operations may further include correlating information associated with each of the set of valid trustware components in a set of data repositories. The set of data repositories may include a trustware component data repository, an enterprise test case data repository, and a test environment data repository. The operations may further include generating a mapping list that includes the set of valid trustware components, a set of test cases corresponding to each of the set of valid trustware components, and one or more test environments corresponding to each of the set of valid trustware components based on the correlation. The operations may further include triggering a set of trustware security units for testing the set of valid trustware components, based on the mapping list and access control permissions received for the test environments that are being provisioned for the testing. The testing may include sequencing and prioritizing execution of the set of test cases so as to cover a testing scope of each of the set of valid trustware components and to cover a testing scope arising out of integrating each of the set of valid trustware components with each of the plurality of remaining valid trustware components. Further, the set of trustware security units may be arranged in at least one of a sequential manner or a parallel manner to align with execution of the set of test cases corresponding to each of the set of valid trustware components. The operations may further include identifying one or more security issues associated with the set of valid trustware components based on the testing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
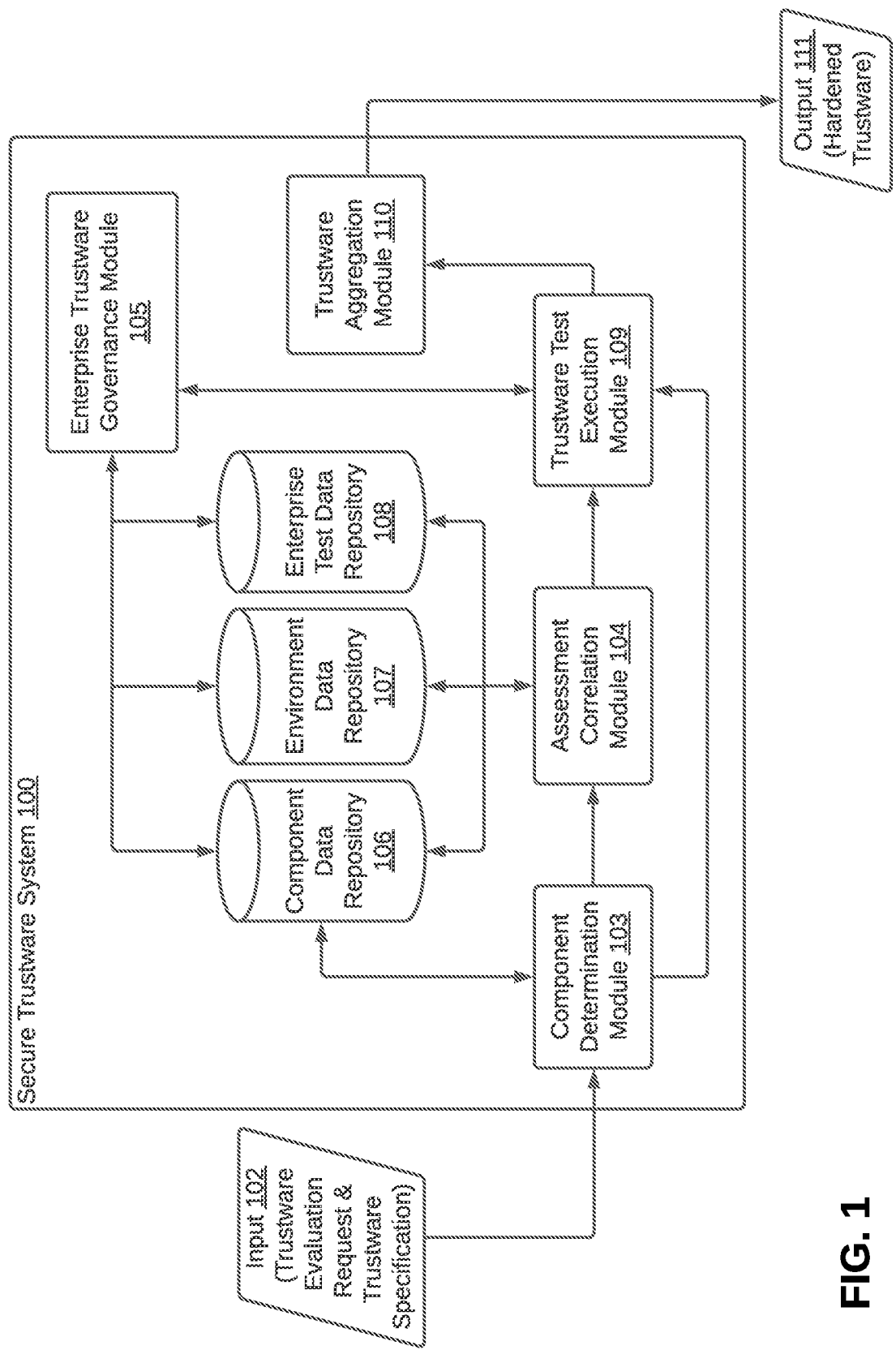
FIG. 1 is a functional block diagram of an exemplary secure trustware system for managing security risk of information technology (IT) systems in an enterprise, in accordance with some embodiments of the present disclosure.

Referring now to FIG. 1, a functional block diagram of an exemplary secure trustware system 100 for managing security risk of information technology (IT) systems in an enterprise is illustrated, in accordance with some embodiments of the present disclosure. In order to manage security risk of IT systems, the secure trustware system 100 may receive an input 102. The input may include, but not limited to, a trustware evaluation request and a trustware specification associated with the IT system within the enterprise. It should be noted that the trustware specification may include metadata corresponding to a plurality of trustware components involved in a trustware and may have a specific format, such as, a JavaScript Object Notation (JSON) format for populating data. In some embodiments, the metadata may include information corresponding to the enterprise, for example a blockchain system. Further, in case of the blockchain system, the information may include a name of the blockchain system, number of nodes, used consensus protocols, usage of smart contracts, used hardware components, and ledger details.

The secure trustware system 100 includes a component determination module 103, an assessment correlation module 104, an enterprise trustware governance module 105, a component data repository 106, an environment data repository 107, an enterprise test case data repository 108, a trustware test execution module 109, a trustware aggregation module 110.

The component determination module 103 may be configured to receive the input 102 including the trustware evaluation request and trustware specification. In some embodiments, by the component determination module 103, the trustware specification may be parsed for determining the plurality of trustware components involved in the trustware of an IT system within the enterprise. The component determination module 103 may also send a query to the component data repository 106 with a list of the plurality of trustware components identified from the trustware specification. The query may be sent to the component data repository 106 to determine valid trustware components. The component determination module 103 may send another request to the component data repository 106 in order to obtain all potential trustware components, for example a set of valid trustware components that need to be considered for evaluating security risk. Based on that, the component determination module 103 may generate a file including the set of valid trustware components that need to be considered for security risk evaluation or to fix any potential security issue. Further, the component determination module 103 may send the generated file of the set of valid trustware components to the assessment correlation module 104.

The assessment correlation module 104 may receive the file including the set of valid trustware components from the component determination module 103. Further the assessment correlation module 104 may be configured to correlate information associated with each of the set of valid trustware components with the information available in the component data repository 106, the environment data repository 107, and enterprise test case data repository 108 to generate a mapping list in detail. Consequently, the mapping list may be generated that includes the set of valid trustware components, a set of test cases corresponding to each of the set of valid trustware components, and one or more test environments corresponding to each of the set of valid trustware components. Further, the assessment correlation module 104 may send a request using the file of set of valid trustware components to the component data repository 106 to extract unique component Identification (ID) for each of the set of valid trustware components in the file. In some embodiments, the assessment correlation module 104 may send a request to the enterprise test case data repository 108 to obtain the set of test cases and a unique test environment ID of each of the one or more test environments corresponding to each of the set of valid trustware components. The set of test cases and a unique test environment ID for each of the set of valid trustware components may be obtained based on the unique component ID of each of the set of valid trustware components. Further, the assessment correlation module 104 may send a request to the environment data repository 107 to obtain the one or more test environments corresponding to each of the set of valid trustware components based on unique test environment IDs. of the one or more test environments.

The mapping may be segregated into two groups. In some embodiment, the mapping list may be generated based on a type of the valid trustware component and an integration of trustware component for input, internal, and output processing, for each of the set of valid trustware components. It should be noted that each group may include information of test cases and test environments associated with the set of valid trustware components. Further, the assessment correlation module 104 may be operatively connected to the trustware test execution module 109 to transmit the mapping list including mapping of trustware components to their respective test environments and test cases.

The enterprise trustware governance module 105 may be used to define roles, access control mechanisms, and information flows among the component data repository 106, the environment data repository 107, the enterprise test case data repository 108, the assessment correlation module 104, and the trustware test execution module 108. In some embodiments, a role definition and access controls for each of the test environments may be performed in the enterprise trustware module 105. Once the roles and the access controls are defined, this information may be sent to the component data repository 106, the environment data repository 107, and the environment test case data repository 108. The information may be shared to permit access for a security analyst to read or modify data repositories 106, 107, and 108, based on access permission enabled for them and to enable provisioning of test units with a right access control for the security analyst to conduct a security test.

It should be noted that the roles, the access control mechanism, and the information flows may be pre-defined. The pre-defined roles may include roles of a holder, an issuer, and a verifier. The holder is an individual that conducts a security test and collects respective test results. The issuer is one who verifies the test results to confirm if it is possible to signed off the security test or not and further provides a proof of the corresponding security test. The verifier is one who verifies the proof of security test signoff to provide a trustware component as secured component to end customers. Further, the information flows may include a claim, a credential, a proof, a registration, and a confirmation. The claim refers to a request for which the security test is performed, and a credential refers to executed and completed test cases. Further, the proof refers to signoff for completion of the security test, and the registration refers to initiation of the security test after the test environments are provisioned as part of the trustware test execution module 109. The confirmation refers to release of secured trustware components to the end customers for consumption.

The component data repository 106 may include a list of valid trustware components including hardware components that may be subjected to various trustware testing activities. These may be finalized after initial assessment by the security analyst and confirming feasibility of conducting security tests for them. In some embodiments, in case of new trustware components, these hardware components may be assessed by the security analyst based on necessity of trustware components in the trustware, suitable test cases for the trustware components, and the test environments for securing them.

Further, the environment data repository 107 may include the trustware test environments for the set of valid trustware components including tools and infrastructure requirements for the valid trustware components. The environment data repository 107 is a reference repository for configuring and deploying required trustware security units either in at least one of a sequential mode or in a parallel mode for all the valid trustware components. The enterprise test case data repository 108 may include all identified test cases for conducting different types of security tests for each of the set of valid trustware components. The enterprise test case data repository 108 is a reference repository for the trustware test-execution module 109.

The trustware test execution module 109 may be configured to receive the file including the set of valid trustware components from the component determination module 103. Additionally, the trustware test execution module 109 may be configured to receive the mapping list from the assessment correlation module 104. Further, the trustware test execution module 109 may receive an input including access control permissions for the test environments that are being provisioned for testing, from the enterprise trustware module 105. In some embodiments, by the trustware test execution module 109, execution of the set of test cases may be sequenced and prioritized to cover scope of each of the set of valid trustware components and to cover a testing scope arising out of integrating each of the set of trustware components with each of the plurality of remaining valid trustware components. Further, based on the set of test cases, the trustware test execution module may be configured to define and deploy the trustware security units for each of the set of valid trustware components and for integrated trustware components. This may further be explained in detail in conjunction with FIGS. 2-3. Further, the trustware test execution module 109 may be communicatively connected to the trustware aggregation module 110.

The trustware aggregation module 110 may be configured to receive an output from the trustware test execution module 109. In particular, the trustware aggregation module 110 may be configured to aggregate outcomes of the trustware security units for each of the set of valid trustware components of the trustware and package one or more security patches along with a master code of the IT system within the enterprise. Further, an output 111 that includes a hardened trustware may be released for consumption. It should be noted that the hardened trustware may include a set of hardened trustware components.

Figure 2:
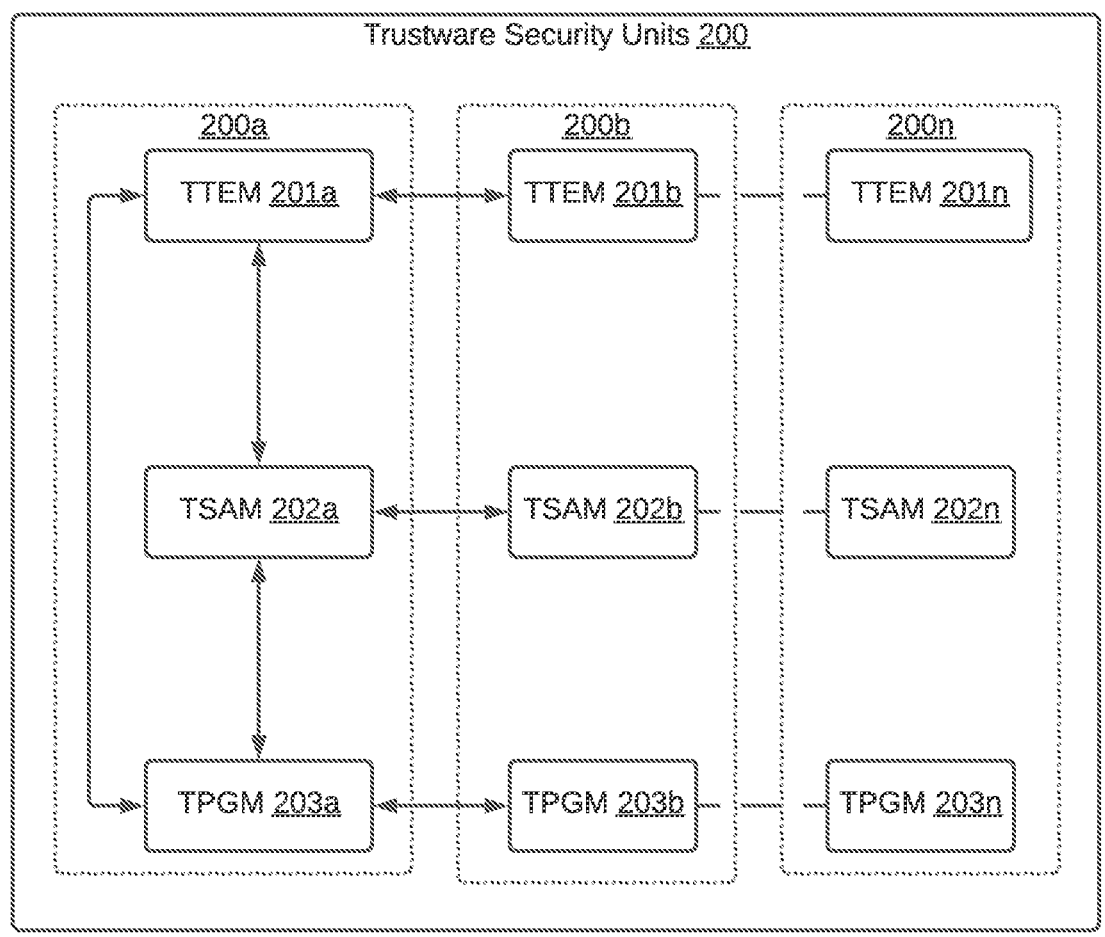
FIG. 2 is a block diagram of a set of trustware security units configured to test a set of valid trustware components, in accordance with some embodiments of the present disclosure.

Referring now to FIG. 2, a block diagram of a set of trustware security units 200 is illustrated, in accordance with some embodiments of the present disclosure. The set of trustware security units 200 is configured to test a set of valid trustware components. As illustrated in FIG. 2, the set of trustware security units 200 is a pipeline of various modules that are integrated together based on planned security experiments. This is similar to an assembly pipeline, where each sub department is responsible for specific activities. The set of trustware security units 200 includes a plurality of security units, such as trustware security units 200a, 200b, . . . 200n. Each of the set of trustware security units 200a, 200b, . . . 200n may include a trustware test environment module (for example, TTEM 201a, TTEM 201b, . . . TTEM 201n), a trustware security assessment module (for example, TSAM 202a, TSAM 202b, . . . TSAM 202n), and a trustware patch generation module (for example, TPGM 203a, TPGM 203b, . . . TPGM 203n).

The trustware security units 200s, 200b, . . . 200n, may be arranged in at least one of a sequential manner or a parallel manner. It should be noted that, in order to align with the set of test cases for execution, the trustware security units 200a, 200b, . . . 200n may be arranged in the parallel manner or the sequential manner. This may enable various trustware security hardening activities in an efficient way without wasting time in reconfiguration of the one or more test environments.

The TTEM 201a, 202b, . . . 201n may be configured to compose or deploy user scenarios or test cases, and test beds for various type of trustware components. It should be noted that a successful security test may depend on setting up a test environment, installation of required tools, and data for the security test. Similarly, a trustware test network is important for getting effective results of various security experiments that may be performed for securing the trustware components. A primary factor to configure the test environment may include user scenario-based test cases and type of trustware component need to be tested. The trustware test environment modules 201a, 201b, . . . 201n may provide a configurable testing environment that may be repurposed easily for each of the test cases to be evaluated. A number of test cases may increase upon integration of the trustware components with each other. This may affect the trustware test network configuration to align with the test cases. To ensure maximum security coverage, it is essentially required that the security test should be conducted on integrated trustware components rather than individual trustware components.

A number of combinations for component integration may not be fixed and it may vary from one system to other system. Further, configuration of each node in the test network may be managed using an Ansible playbook. This way, efficiency of configuring the test network may be enhanced. Nodes in the test network may contain a set of test scripts and tools for testing purpose. Further, based on the test scenarios covering individual trustware components as well as integrated trustware components, various test networks may be integrated together to conduct a variety of planned tests. The outcome of the TTEM 201a, 201b, . . . 201n may be fed to the TSAM 202a, 202b, . . . 202n, respectively for conducting the planned security tests. The outcome of the TTEM 201a, 201b, . . . 201n may include the test environment provisioned with predefined security tools.

Further, the TSAM 202a, 202b, . . . 202n may be configured to verify and validate various type of trustware components. The TSAM 202a, 202b, . . . 202n may include selected tools that may be either third party tools or in-house tools for the testing. The third-party tools need to be configured for specific purposes before deploying them for active security testing. The TSAM 202a, 202b, . . . 202n may focus on specific trustware components like software components and the hardware components. The TSAM 202a, 202b, . . . 202n may be deployed to secure endpoints and code components of the trustware. An outcome of the TSAM 202a, 202b, . . . 202n may be fed to the TPGM 203a, 203b, . . . 203n, respectively for resolution or patch generation. The outcome of the TSAM 202a, 202b, . . . 202n may include security issues identified during the testing or while performing the security test. The TSAM 202a, 202b, . . . 202n is set up specifically to assess and secure specific software components or hardware components that have a new version or customer identified new alternate for consumption.

The TPGM 203a, 203b, . . . 203n may be configured to generate trustware specific security patches corresponding to the identified issues associated with the trustware components. The TPGM 203a, 203b, . . . 203n may often be deployed at an end of the trustware security assessment pipeline to generate the trustware specific security patches or resolve identified vulnerabilities or security gaps in the trustware components. The trustware specific patches may also be referred as patches or security patches in some embodiments of the present disclosure. The TPGM 203a, 203b, . . . 203n may be a set up as part of the trustware security assessment pipeline. The TPGM 203a, 203b, . . . 203n may also have their own set of security controls to ensure that the one or more security specific trustware patches generated to resolve security issues may not be impacted by external factors. Further, the TPGM 203a, 203b, . . . 203n focus on the software components and protocols of the trustware that need to be evaluated for security risks or security gaps. In case of hardware components, feasibility of introducing additional software components to secure the hardware components may be explored. An outcome generated by the TPGM 203a, 203b, . . . 203n may be leveraged for conducting experiments again in the set of trustware security units 200 or the trustware test networks till a plurality of conditions are met. The plurality of conditions may include successful completion of all the planned security experiments and successful application of patches to resolve all the security issues.

The TPGM 203a, 203b, . . . 203n may also be responsible for integrating fixes with the trustware components for identified security issues and this action may be performed after an exit criterion for the security experiments is met. Finally, in some embodiments, secured trustware components may be released to the customers via the trustware aggregation module 110. Additional functionalities of the set of trustware security units may be further explained in conjunction with FIG. 3.

Figure 3:
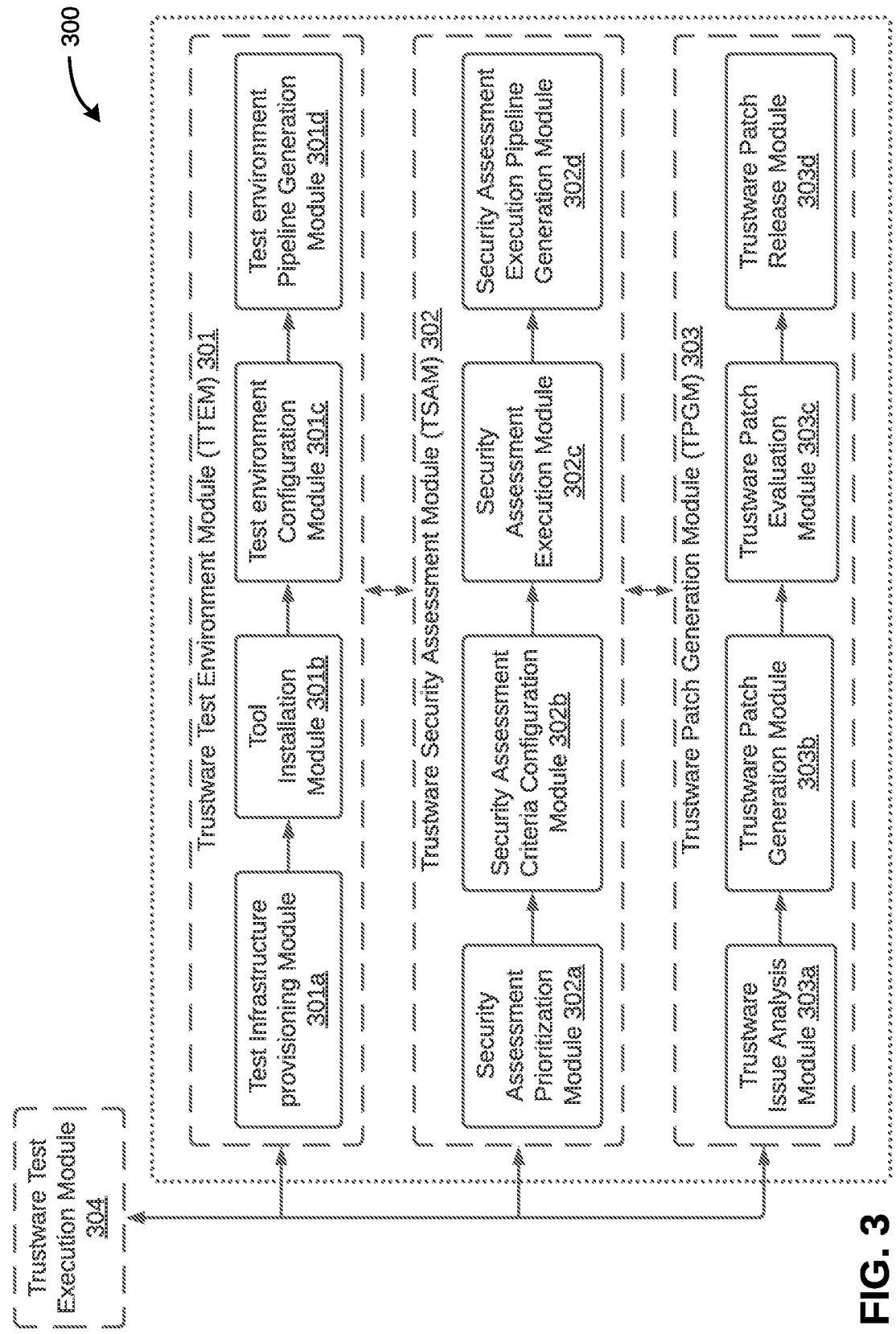
FIG. 3 illustrates internal architecture of an exemplary trustware security unit, in accordance with some embodiments of the present disclosure.

Referring now to FIG. 3, internal architecture of an exemplary trustware security unit 300 (analogous to the trustware security units 200a, 200b, . . . 200n) is illustrated, in accordance with some embodiments of the present disclosure. This architecture may support any number of trustware components and integrated trustware components. For example, consider a scenario where security risk of an IT system within an enterprise needs to be evaluated for two valid trustware components (i.e., component 1 and component 2). In that scenario, architecture of the trustware security unit 300 (for example, the trustware security unit 200a) may be triggered for component 1 and component 2, separately. Further, additional architecture of another trustware security unit (for example, the trustware security unit 200b) may also triggered to evaluate the security risk arising due to the integration of the component 1 and component 2.

The trustware security unit 300 includes a TTEM 301, a TSAM 302, and a TPGM 303. These modules 201, 302, and 303 may be triggered and driven by a trustware test execution module 304 (same as the trustware test execution module 109) as illustrated in FIG. 3. Further, the TTEU 301 includes a test infrastructure provisioning module 301a, a tool installation module 301b, a test environment configuration module 301c, and a test environment pipeline generation module 301d. The test infrastructure provisioning module 301a may be configured to provision a required infrastructure for hosting a trustware test environment. This may be a combination of on-premise hardware and cloud instances depending on type of the trustware components to be assessed. Further, the tool installation module 301b may be configured to install identified security tools in the infrastructure provisioned for hosting the trustware test environment. The test environment configuration module 301c may be configured to form the trustware test environment as a part of a process for initiating trustware security assessments. The test environment pipeline generation module 301d may be configured to generate pipelines of inter-related trustware test environments to perform a variety of trustware security assessments covering testing environments of individual trustware components as well as integrated trustware components of the IT system.

The TSAM 302 includes a security assessment prioritization module 302a, a security assessment criteria configuration module 302b, a security assessment execution module 302c, and a security assessment execution pipeline generation module 302d. The security assessment prioritization module 302a may be configured to prioritize the security assessments based on a trustware component under preview and ensuring that the most critical assessments may be executed on first intending to eliminate severe vulnerability issues in the trustware component. The security assessment criteria configuration module may be configured to evaluate existing security assessment criteria and configuring them based on requirements associated with the valid trustware components subjected for security risk assessment. A scope of security testing may range from testing of the individual trustware components to testing of integrated trustware components. And, the test cases may be prioritized based on a risk severity index associated with the individual trustware components and the integrated trustware components. The security assessment execution module 302c may be configured to execute the security assessment in an automated manner and to review outcomes of the security assessments. Further, in some embodiments, identified security issues may be collated and shared with the TPGM 303 for resolution. It should be noted that the security assessments may be repeated until all the security issues are resolved. Further, the security assessment execution pipeline generation module 302d may integrate various trustware security assessment modules together to form a pipeline. This way, a series of security assessments may be conducted for the trustware component as well as for the integrated trustware components in the sequential or parallel manner.

Further, the TPGM 303 includes a trustware issue analysis module 303a, a trustware patch generation module 303b, a trustware patch evaluation module 303c, and a trustware patch release module 303d. The trustware issue analysis module 303a may be configured to enable the trustware security analyst to analyze reported security issues or vulnerabilities and subsequently to recommend suitable resolution measures. The security analyst may also assess requirements of the test environments and requirements of the test cases. Accordingly, suitable recommendations may be provided to a patch development team. Further, an outcome of trustware issue analysis module 303a may be fed to the trustware patch generation module 303b. The patch development team will may receive the recommendations from the trustware security analyst. This module may enable the patch development team to configure appropriate environment to generate a patch and to test the same. Once the patch is generated and tested for resolution of the identified issues, the patch may be shared back to the TSAM 302 for evaluating the patches and to confirm successful completion of respective security assessments. On confirmation of completion of the security assessments, a notification may be generated and sent to the trustware patch release module 303d. The trustware patch release module 303d may package the generated patches and make them ready to release. The packaged patches may be released only upon receiving the notification from the TSAM 302. The patches may be released to a trustware aggregation module (same as the trustware aggregation module 110) for integrating the patches with respective trustware components and further the secure trustware components may be released for active consumption.

It should be noted that the secure trustware system 100 and the trustware security units 200, 300 may be implemented in programmable hardware devices such as programmable gate arrays, programmable array logic, programmable logic devices, or the like. Alternatively, the secure trustware system 100 and the trustware security units 200, 300 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together but may include disparate instructions stored in different locations which, when joined logically together, comprise the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for managing security risk of IT systems in an enterprise. For example, the exemplary system 100 may manage security risk of IT systems in an enterprise by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
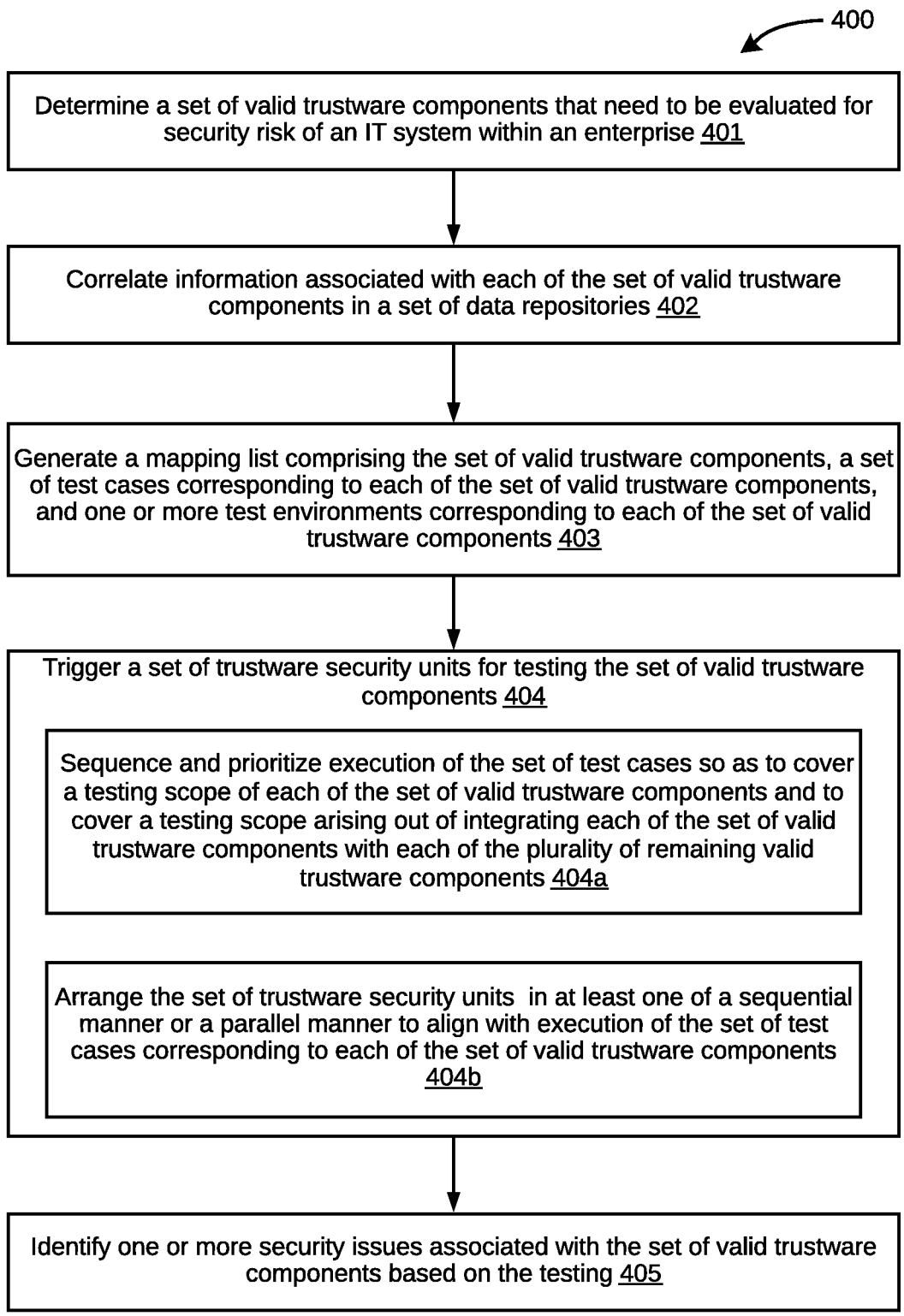
FIG. 4 is a flow diagram of an exemplary process for managing security risk of IT systems in an enterprise, in accordance with some embodiments of the present disclosure.

For example, referring now to FIG. 4, exemplary process 400 for managing security risk of IT systems in an enterprise is depicted via a flow chart, in accordance with some embodiments of the present disclosure. Each step of the process 400 may be performed by via a system, such as the secure trustware system 100.

As illustrated in the flowchart, at step 401, a set of valid trustware components that need to be evaluated for security risk of an IT system within an enterprise may be determined. In some embodiments, a trustware evaluation request and a trustware specification associated with the IT system within the enterprise may be received. It should be noted that the trustware specification may include metadata corresponding to a plurality of trustware components involved in a trustware. Additionally, in some embodiments, the trustware specification may be parsed. Parsing may be performed intending to determine the plurality of trustware components. Further, in some embodiments, the trustware component data repository may be queried for each of the plurality of trustware components. This may be accomplished to determine the set of valid trustware components that need to be evaluated for security risk.

At step 402, information associated with each of the set of valid trustware components may be correlated in a set of data repositories. The set of data repositories may include a trustware component data repository (similar to the trustware component data repository), an enterprise test case data repository (similar to the enterprise test case data repository), and a test environment data repository (similar to the test environment data repository).

At step 403, a mapping list may be generated. The mapping list may include the set of valid trustware components, and a set of test cases and one or more test environments corresponding to each of the set of valid trustware components. It should be noted that the mapping list may be generated based on the correlation. In some embodiments, the trustware component data repository may be queried. This may result in extraction of a unique component identification of each of the set of valid trustware components. Further, in some embodiments, the enterprise test case data repository may be queried. This way, the set of test cases and a unique test environment identification of each of the one or more test environments corresponding to each of the set of valid trustware components may be determined. It should be noted that the enterprise test case data repository may be queried based on the unique component identification of each of the set of valid trustware components.

In some embodiments, the test environment data repository may also be queried, based on the unique test environment identification of each of the one or more test environments. This may be performed for determining the one or more test environments corresponding to each of the set of valid trustware components. Also, in some embodiments, the mapping list may be generated based on a type of valid trustware component and an integration of trustware component for input, internal, and output processing, for each of the set of valid trustware components.

At step 404, a set of trustware security units (for example, the trustware security units) may be triggered. The set of trustware security units may be triggered for testing the set of valid trustware components. To trigger the set of trustware security units, the mapping list and access control permissions (i.e. access control permissions received for the test environments that are being provisioned for the testing) may be considered. It should be noted that step 404 may further include two sub steps. At step 404a, execution of the set of test cases may be sequenced and prioritized. This may be performed in order to cover a testing scope of each of the set of valid trustware components and to cover a testing scope arising out of integrating each of the set of valid trustware components with each of the plurality of remaining valid trustware components. In particular, the execution of the set of test cases may be prioritized based on a risk severity index associated with each of the set of valid trustware components, individually or in integration with each other. At step 404b, the set of trustware security units are arranged in at least one of a sequential manner or a parallel manner. This may be performed in order to align the set of trustware security units with execution of the set of test cases corresponding to each of the set of valid trustware components.

At step 405, one or more security issues associated with the set of valid trustware components may be identified based on testing. In some embodiments, one or more trustware specific security patches may be generated corresponding to the one or more security issues associated with the set of valid trustware components. The one or more security patches may be packaged along with a master code of the IT system within the enterprise. Further, in some embodiments, the one or more trustware specific security patches may be applied to specific trustware components from among the set of valid trustware components. It should be noted that the patches may be applied in order to generate a set of hardened trustware components. To this end, a hardened trustware may be released. It should be noted that the hardened trustware may include the set of hardened trustware components.

Figure 5:
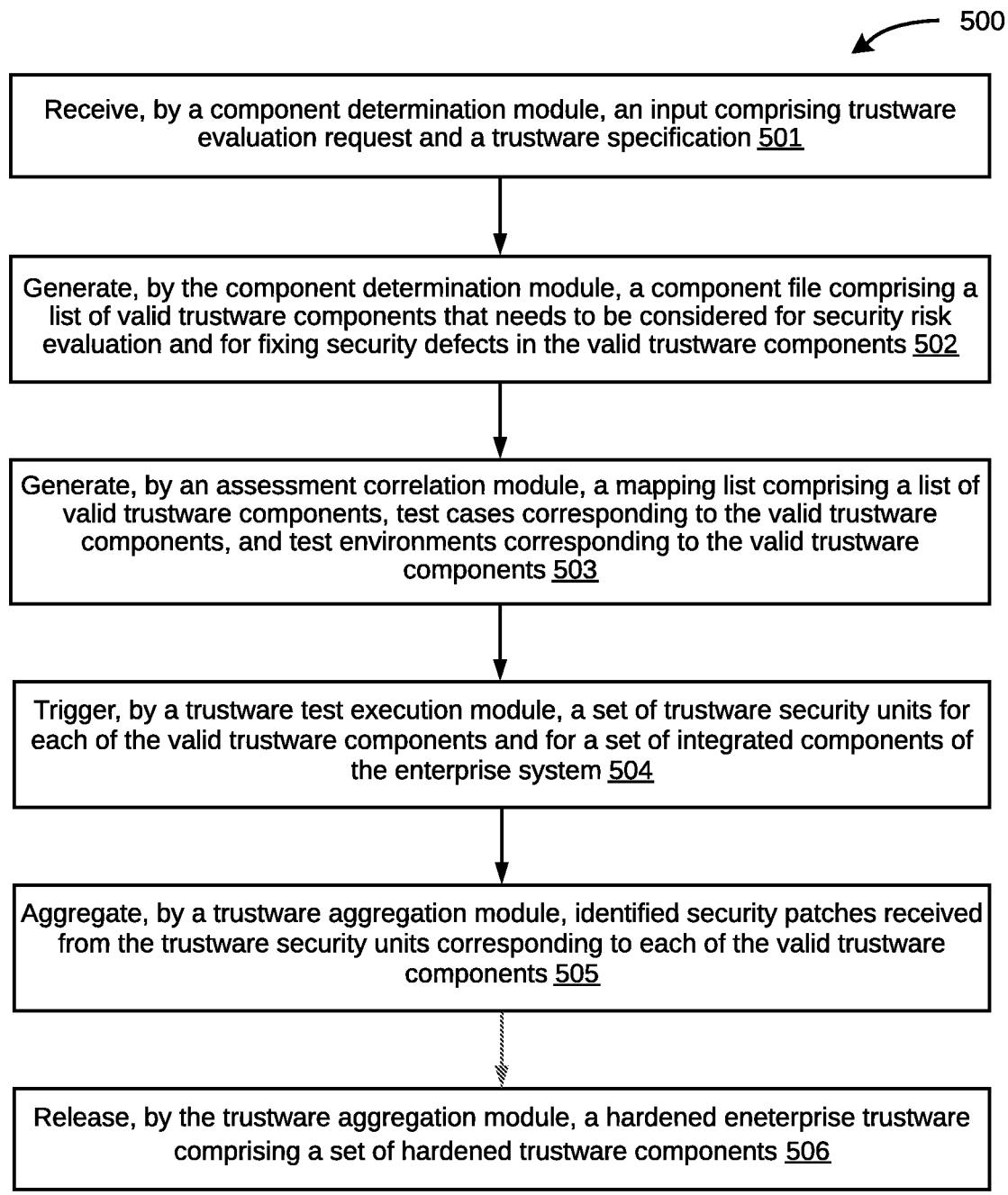
FIG. 5 is a flow diagram of a detailed exemplary process for managing security risk of IT systems in an enterprise, in accordance with some embodiments of the present disclosure.

Referring now to FIG. 5, exemplary process 500 for managing security risk of IT systems in an enterprise is depicted in greater detail via a flow chart, in accordance with some embodiments of the present disclosure. Each step of the process 500 may be performed by various modules 103-110 of the secure trustware system 102.

As illustrated in the flowchart, at step 501, an input (same as the input 102) may be received by the component determination module 103. The input may include a trustware evaluation request and a trustware specification. The trustware specification may have a specific format (say, JSON format) for data population. It should be noted that the trustware specification is a metadata corresponding to a plurality of trustware components involved in a trustware, provided by a requestor. Further, information associated with the trustware components may be evaluated to crosscheck if data about the trustware components is available or not. In some embodiments, the trustware specification may be parsed to determine a plurality of trustware components involved in a trustware At step 502, a component file that includes valid trustware components may be generated. The valid trustware components may be further considered for security risk evaluation and for fixing security defects in the valid trustware components. In some embodiments, a query may be sent to the component data repository 106 with the list of the plurality of trustware components. After identifying the valid trustware components from the plurality of trustware components another request may also be sent to the component data repository 106 to obtain potential trustware components that may be considered for security risk evaluation. In other words, trustware components may be validated against the component data repository 106. Further, in some embodiments, the generated components file may be sent to the assessment correlation module 104.

Thereafter, at step 503, a mapping list may be generated. The mapping list includes the valid trustware components, test cases corresponding to each of the valid trustware components, and test environments corresponding to each of the valid trustware components. The mapping list may be generated based on the component file. After receiving the component file from the component determination module 103, the assessment correlation module 104 may map information associated with the valid trustware components with information available in each of the component data repository 106, environment data repository 107, and enterprise test case data repository 108 to generate the mapping list. Further, in some embodiments, a request using the component file may be sent to the component data repository 106 to extract unique identifications (IDs) for the valid trustware components of the component file. After receiving the unique IDs, a request may be sent to the enterprise test case data repository 108 along with the unique ID to obtain test cases and their corresponding test environment IDs for the valid trustware components. After obtaining the environment IDs, a request may be sent to the environment data repository 107 along with the test environment IDs to obtain test environment details for the identified test cases corresponding to the valid trustware components in the component file. Further, the detailed mapping list including mapping of the valid trustware components to their respective test environments and test cases may be sent to the trustware test execution module 109. In some embodiments, at least one test environment and one test case for the valid trustware components may be correlated.

At step 504, a set of trustware security units 200 may be triggered for each of the valid trustware components and for two or more integrated trustware components of the IT system. In some embodiments, the component file including the valid trustware components may be received. In addition to the components file, in some embodiments, the detailed mapping list including mapping of the valid trustware components to their respective test environments and test cases may also be received from the assessment correlation module 104. Moreover, an input that includes access control permissions for the test environments being provisioned for security testing may be received. In some embodiments, execution of the test cases may be sequenced and prioritized by covering scope of each valid trustware component and testing scope arising out of integrating each valid trustware component with other valid trustware components. This has already been explained in detail in conjunction with FIGS. 1-3.

At step 505, the security patches corresponding to each of the valid trustware components may be aggregated. Further, in some embodiments, outcomes corresponding to each of the valid trustware components from the set of trustware security units may be aggregated and the security patches along with a master code of the IT system within the enterprise may be packaged. In some embodiments, the security patches may be applied to specific trustware components from the valid trustware components to generate a set of hardened trustware components Thereafter, at step 506, a hardened trustware that includes the set of hardened trustware components may be released.

By way of an example, consider a scenario where a hyper-ledger fabric based system trustware evaluation request is received. Initially, all trustware components may be identified. For the hyper-ledger fabric based system, key components may include a plurality of assets, a shared ledger, a smart contract, peer nodes, a channel, organizations, a membership service provider (MSP), and an ordering service. Further, all the trustware components provided by a requester or a customer may be verified against a component data repository. It may be required to have all the trustware components listed above as a part of a trustware component specification shared by the requestor or the customer. Once the identification and verification of the components is performed, then the identified trustware components may be correlated with security assessment test environments and security assessment test cases. Further, a mapping list may be generated for each of the identified trustware components. This mapping list may be verified for access control mechanism using an enterprise trust framework. Further, a security test execution plan may be defined and required trustware security Units for security assessments may be deployed. Identification of any vulnerability or issue during the assessment process may lead to initiate a patch development process. Once patches are evaluated and all planned security assessments are performed as per defined completion criteria, the patches may be integrated with respective trustware components and made available for release for active consumption.

The present disclosure may provide many advantages in order to overcome the problems encountered in conventional systems and methods. As discussed above, the present disclosure proactively provides security support to end customers that may cover security vulnerability assessment report, identified, and verified security patch, integrated security test environment for application of security patch and reassessment. Further, test case repository is constantly updated from repeated security experiments to increase security test coverage for the components in a trustware solution. This may help to overcome drawback of existing security tools which depend on only known security vulnerabilities. Moreover, the present disclosure enables to subject specific components in a trustware to customized security experiments. This may be useful during upgrading of such components in a trustware solution. In short, the present disclosure provides end-to-end security for the trustware components (for example, software components, hardware components, and used protocols) of an enterprise system by dynamically generating a plurality of trustware security units in an efficient way.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
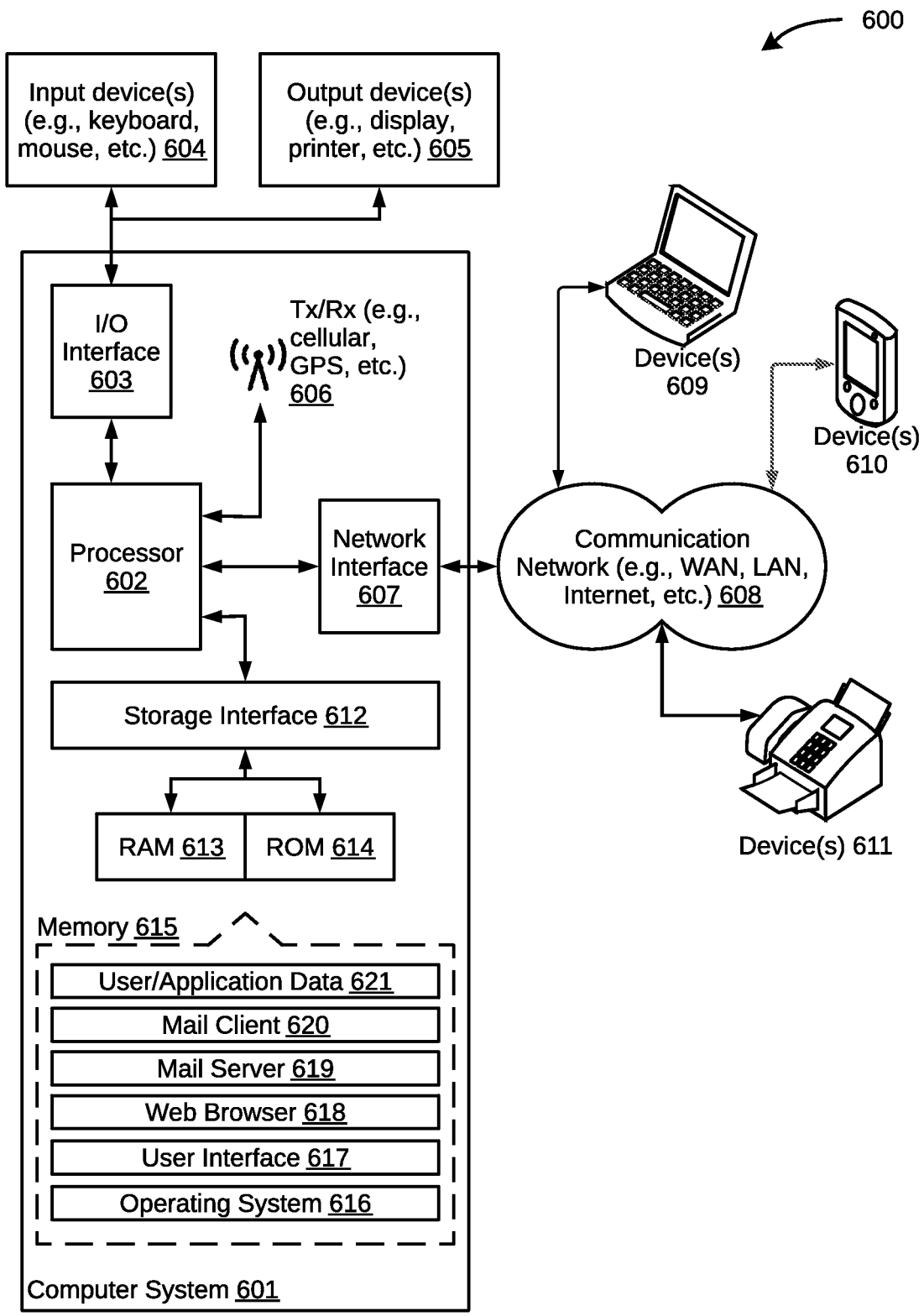
FIG. 6 illustrates a block diagram of an exemplary computer system for implementing embodiments consistent with the present disclosure.

For example, the disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing secure trustware system 100 or the associated trustware security units 200, 300 for managing security risk of IT systems in an enterprise. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WILINK WL1283®, BROADCOM® BCM4750IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., trustware evaluation request, trustware specification, list of valid trustware components, trustware component data repository, enterprise test case data repository, test environment data repository, mapping list, trustware security units, identified security issues, trustware specific security patches, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for managing security risk of IT systems in an enterprise. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing security risk of information technology (IT) systems in an enterprise, the method comprising:

determining, by a secure trustware system, a set of valid trustware components that need to be evaluated for security risk of an IT system within an enterprise;

correlating, by the secure trustware system, information associated with each of the set of valid trustware components in a set of data repositories, wherein the set of data repositories comprises a trustware component data repository, an enterprise test case data repository, and a test environment data repository;

generating, by the secure trustware system, a mapping list comprising the set of valid trustware components, a set of test cases corresponding to each of the set of valid trustware components, and one or more test environments corresponding to each of the set of valid trustware components based on the correlation;

triggering, by the secure trustware system, a set of trustware security units for testing the set of valid trustware components, based on the mapping list and access control permissions received for the test environments that are being provisioned for the testing, wherein:

the testing comprises sequencing and prioritizing execution of the set of test cases so as to cover a testing scope of each of the set of valid trustware components and to cover a testing scope arising out of integrating each of the set of valid trustware components with each of the plurality of remaining valid trustware components, and the set of trustware security units are arranged in at least one of a sequential manner or a parallel manner to align with execution of the set of test cases corresponding to each of the set of valid trustware components; and identifying, by the secure trustware system, one or more security issues associated with the set of valid trustware components based on the testing.

2. The method of claim 1, wherein determining the set of valid trustware components comprises:

receiving, by the secure trustware system, a trustware evaluation request and a trustware specification associated with the IT system within the enterprise, wherein the trustware specification comprises metadata corresponding to a plurality of trustware components involved in a trustware;

parsing, by the secure trustware system, the trustware specification to determine the plurality of trustware components; and querying, by the secure trustware system, the trustware component data repository for each of the plurality of trustware components to determine the set of valid trustware components that need to be evaluated for security risk.

3. The method of claim 1, wherein generating the mapping list further comprises:

querying, by the secure trustware system, the trustware component data repository to extract a unique component identification of each of the set of valid trustware components;

querying, by the secure trustware system, the enterprise test case data repository to determine the set of test cases and a unique test environment identification of each of the one or more test environments corresponding to each of the set of valid trustware components, based on the unique component identification of each of the set of valid trustware components; and querying, by the secure trustware system, the test environment data repository to determine the one or more test environments corresponding to each of the set of valid trustware components, based on the unique test environment identification of each of the one or more test environments.

4. The method of claim 1, wherein generating the mapping list further comprises generating the mapping list based on a type of valid trustware component and an integration of trustware component for input, internal, and output processing, for each of the set of valid trustware components.

5. The method of claim 1, wherein sequencing and prioritizing the execution of the set of test cases comprises prioritizing the execution of the set of test cases based on a risk severity index associated with each of the set of valid trustware components, individually or in integration with each other.

6. The method of claim 1, further comprising generating, by the secure trustware system, one or more trustware specific security patches corresponding to the one or more security issues associated with the set of valid trustware components.

7. The method of claim 6, further comprising:

packaging, by the secure trustware system, the one or more security patches along with a master code of the IT system within the enterprise;

applying, by the secure trustware system, the one or more trustware specific security patches to specific trustware components from among the set of valid trustware components to generate a set of hardened trustware components; and releasing, by the secure trustware system, a hardened trustware comprising the set of hardened trustware components.

8. A system for managing security risk of information technology (IT) systems in an enterprise, the system comprising:

a processor; and a memory communicatively coupled to the processor, wherein the memory stores processor-executable instructions, which, on execution, causes the processor to:

determine a set of valid trustware components that need to be evaluated for security risk of an IT system within an enterprise;

correlate information associated with each of the set of valid trustware components in a set of data repositories, wherein the set of data repositories comprises a trustware component data repository, an enterprise test case data repository, and a test environment data repository;

generate a mapping list comprising the set of valid trustware components, a set of test cases corresponding to each of the set of valid trustware components, and one or more test environments corresponding to each of the set of valid trustware components based on the correlation;

trigger a set of trustware security units for testing the set of valid trustware components, based on the mapping list and access control permissions received for the test environments that are being provisioned for the testing, wherein:

the testing comprises sequencing and prioritizing execution of the set of test cases so as to cover a testing scope of each of the set of valid trustware components and to cover a testing scope arising out of integrating each of the set of valid trustware components with each of the plurality of remaining valid trustware components, and the set of trustware security units are arranged in at least one of a sequential manner or a parallel manner to align with execution of the set of test cases corresponding to each of the set of valid trustware components; and identify one or more security issues associated with the set of valid trustware components based on the testing.

9. The system of claim 8, wherein the processor-executable instructions cause the processor to determine the set of valid trustware components by:

receiving a trustware evaluation request and a trustware specification associated with the IT system within the enterprise, wherein the trustware specification comprises metadata corresponding to a plurality of trustware components involved in a trustware;

parsing the trustware specification to determine the plurality of trustware components; and querying the trustware component data repository for each of the plurality of trustware components to determine the set of valid trustware components that need to be evaluated for security risk.

10. The system of claim 8, wherein the processor-executable instructions cause the processor to generate the mapping list by:

querying the trustware component data repository to extract a unique component identification of each of the set of valid trustware components;

querying the enterprise test case data repository to determine the set of test cases and a unique test environment identification of each of the one or more test environments corresponding to each of the set of valid trustware components, based on the unique component identification of each of the set of valid trustware components; and querying the test environment data repository to determine the one or more test environments corresponding to each of the set of valid trustware components, based on the unique test environment identification of each of the one or more test environments.

11. The system of claim 8, wherein the processor-executable instructions cause the processor to generate the mapping list based on a type of valid trustware component and an integration of trustware component for input, internal, and output processing, for each of the set of valid trustware components.

12. The system of claim 8, wherein the processor-executable instructions cause the processor to prioritize the execution of the set of test cases based on a risk severity index associated with each of the set of valid trustware components, individually or in integration with each other.

13. The system of claim 8, wherein the processor-executable instructions further cause the processor to generate one or more trustware specific security patches corresponding to the one or more security issues associated with the set of valid trustware components.

14. The system of claim 13, wherein the processor-executable instructions further cause the processor to:
package the one or more security patches along with a master code of the IT system within the enterprise;
apply the one or more trustware specific security patches to specific trustware components from among the set of valid trustware components to generate a set of hardened trustware components; and
release a hardened trustware comprising the set of hardened trustware components.

15. A non-transitory computer-readable medium having stored thereon a set of computer-executable instructions for managing security risk of information technology (IT) systems in an enterprise, the set of computer-executable instructions causing a computer comprising one or more processors to perform steps comprising:
determining a set of valid trustware components that need to be evaluated for security risk of an IT system within an enterprise;
correlating information associated with each of the set of valid trustware components in a set of data repositories, wherein the set of data repositories comprises a trustware component data repository, an enterprise test case data repository, and a test environment data repository;
generating a mapping list comprising the set of valid trustware components, a set of test cases corresponding to each of the set of valid trustware components, and one or more test environments corresponding to each of the set of valid trustware components based on the correlation;
triggering a set of trustware security units for testing the set of valid trustware components, based on the mapping list and access control permissions received for the test environments that are being provisioned for the testing, wherein:

the testing comprises sequencing and prioritizing execution of the set of test cases so as to cover a testing scope of each of the set of valid trustware components and to cover a testing scope arising out of integrating each of the set of valid trustware components with each of the plurality of remaining valid trustware components, and the set of trustware security units are arranged in at least one of a sequential manner or a parallel manner to align with execution of the set of test cases corresponding to each of the set of valid trustware components; and identifying one or more security issues associated with the set of valid trustware components based on the testing.

16. The non-transitory computer-readable medium of claim 15, determining the set of valid trustware components comprises:
receiving a trustware evaluation request and a trustware specification associated with the IT system within the enterprise, wherein the trustware specification comprises metadata corresponding to a plurality of trustware components involved in a trustware;
parsing the trustware specification to determine the plurality of trustware components; and
querying the trustware component data repository for each of the plurality of trustware components to determine the set of valid trustware components that need to be evaluated for security risk.

17. The non-transitory computer-readable medium of claim 15, wherein generating the mapping list further comprises:
querying the trustware component data repository to extract a unique component identification of each of the set of valid trustware components;
querying the enterprise test case data repository to determine the set of test cases and a unique test environment identification of each of the one or more test environments corresponding to each of the set of valid trustware components, based on the unique component identification of each of the set of valid trustware components; and
querying the test environment data repository to determine the one or more test environments corresponding to each of the set of valid trustware components, based on the unique test environment identification of each of the one or more test environments.

18. The non-transitory computer-readable medium of claim 15, wherein generating the mapping list further comprises generating the mapping list based on a type of valid trustware component and an integration of trustware component for input, internal, and output processing, for each of the set of valid trustware components.

19. The non-transitory computer-readable medium of claim 15, wherein sequencing and prioritizing the execution of the set of test cases comprises prioritizing the execution of the set of test cases based on a risk severity index associated with each of the set of valid trustware components, individually or in integration with each other.

20. The non-transitory computer-readable medium of claim 15, wherein the steps further comprise:
generating one or more trustware specific security patches corresponding to the one or more security issues associated with the set of valid trustware components;
packaging the one or more security patches along with a master code of the IT system within the enterprise;
applying the one or more trustware specific security patches to specific trustware components from among the set of valid trustware components to generate a set of hardened trustware components; and releasing a hardened trustware comprising the set of hardened trustware components.

\* \* \* \* \*